United States Patent
Nelson et al.

(10) Patent No.: US 11,082,418 B2
(45) Date of Patent: Aug. 3, 2021

(54) PRIVACY ENSURED BROKERED IDENTITY FEDERATION

(71) Applicants: Mark A. Nelson, Old Lyme, CT (US); George S. Rathbun, Mystic, CT (US); Scott Kern, Salt Lake City, UT (US)

(72) Inventors: Mark A. Nelson, Old Lyme, CT (US); George S. Rathbun, Mystic, CT (US); Scott Kern, Salt Lake City, UT (US)

(73) Assignee: Avalanche Cloud Corporation, Salt Lake City, UT (US)

( * ) Notice: Subject to any disclaimer, the term of this patent is extended or adjusted under 35 U.S.C. 154(b) by 540 days.

(21) Appl. No.: 15/895,682

(22) Filed: Feb. 13, 2018

(65) Prior Publication Data
US 2018/0234409 A1 Aug. 16, 2018

Related U.S. Application Data

(60) Provisional application No. 62/458,151, filed on Feb. 13, 2017.

(51) Int. Cl.
*H04L 29/06* (2006.01)
*H04L 9/32* (2006.01)

(52) U.S. Cl.
CPC ........ *H04L 63/0815* (2013.01); *H04L 9/3255* (2013.01); *H04L 9/3257* (2013.01); *H04L 63/0421* (2013.01); *H04L 63/10* (2013.01); *H04L 63/12* (2013.01)

(58) Field of Classification Search
CPC . H04L 63/0815; H04L 63/0421; H04L 63/10; H04L 63/12; H04L 9/3255; H04L 9/3257
See application file for complete search history.

(56) References Cited

U.S. PATENT DOCUMENTS

| | | | |
|---|---|---|---|
| 7,581,248 B2* | 8/2009 | Atkins | H04L 29/06 726/18 |
| 7,657,639 B2* | 2/2010 | Hinton | H04L 63/0815 709/229 |
| 8,261,330 B2* | 9/2012 | Atkins | H04L 63/0823 726/4 |
| 8,468,359 B2* | 6/2013 | Morris | H04L 9/3257 713/180 |
| 8,522,039 B2* | 8/2013 | Hyndman | G06Q 20/40 713/185 |

(Continued)

*Primary Examiner* — Linglan E Edwards
(74) *Attorney, Agent, or Firm* — Dunlap Bennett & Ludwig, PLLC; Brendan E. Squire

(57) ABSTRACT

A system, method, apparatus, and computer program product for a privacy ensured brokered identity federation system. The privacy ensured brokered identity federation system connects a user in a brokered identity federation environment that blinds relying parties (RP) from credential service providers (CSP), blinds CSPs from RPs, and blinds a user's identity and data from the federation middleware hubs. The system utilizes ring signatures to attest to CSPs that a valid RP of the federation is making a request. The process utilizes CSP ring signatures to assure RPs that a valid CSP of the federation has provided a response. The process utilizes per transaction encryption keys created by the RP to ensure the federation has no access to data messages. It can further ensure that only the correct RP can decrypt a CSP response.

11 Claims, 3 Drawing Sheets

(56) References Cited

U.S. PATENT DOCUMENTS

| | | | | |
|---|---|---|---|---|
| 8,689,306 B2* | 4/2014 | Canard | | H04L 63/0823 |
| | | | | 726/8 |
| 8,856,957 B1* | 10/2014 | Roth | | G06F 21/33 |
| | | | | 726/28 |
| 9,262,623 B2* | 2/2016 | Stecher | | G06F 21/45 |
| 9,268,933 B2* | 2/2016 | Stecher | | H04L 63/0421 |
| 9,596,122 B2* | 3/2017 | Hinton | | H04L 63/0815 |
| 10,469,492 B2* | 11/2019 | Hall | | H04L 63/126 |
| 2009/0019285 A1* | 1/2009 | Chen | | G06F 21/575 |
| | | | | 713/175 |
| 2016/0253663 A1* | 9/2016 | Clark | | G06Q 20/3274 |
| | | | | 705/75 |

* cited by examiner

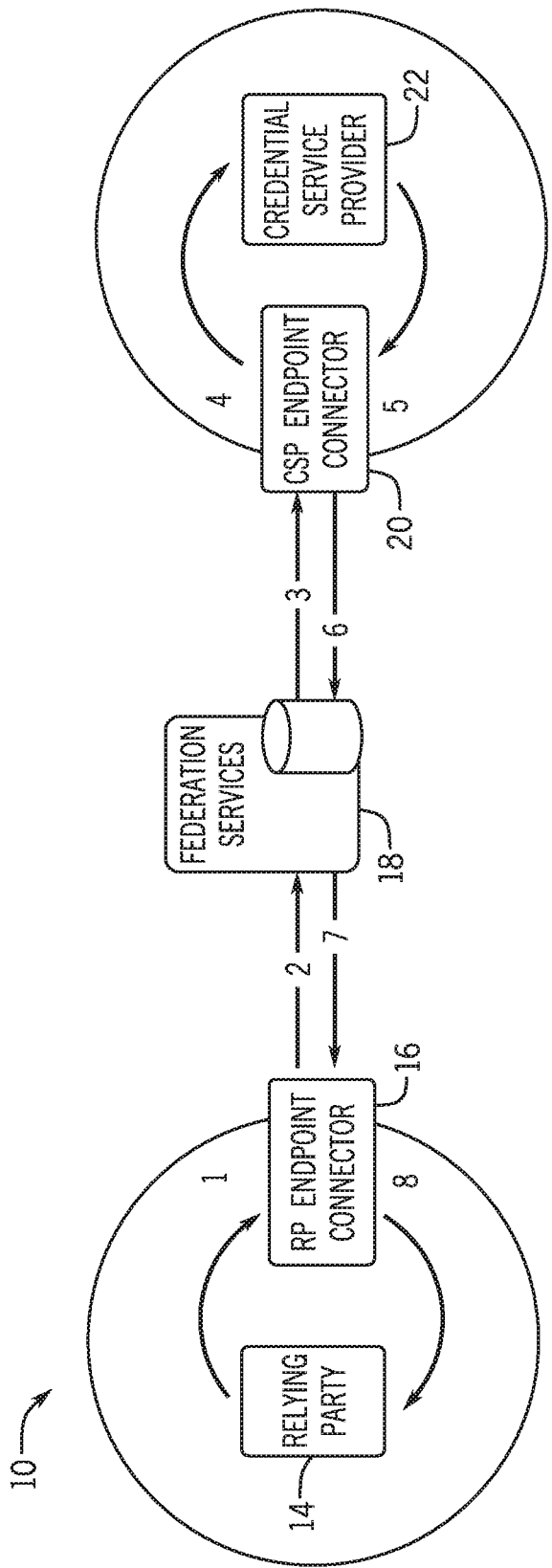
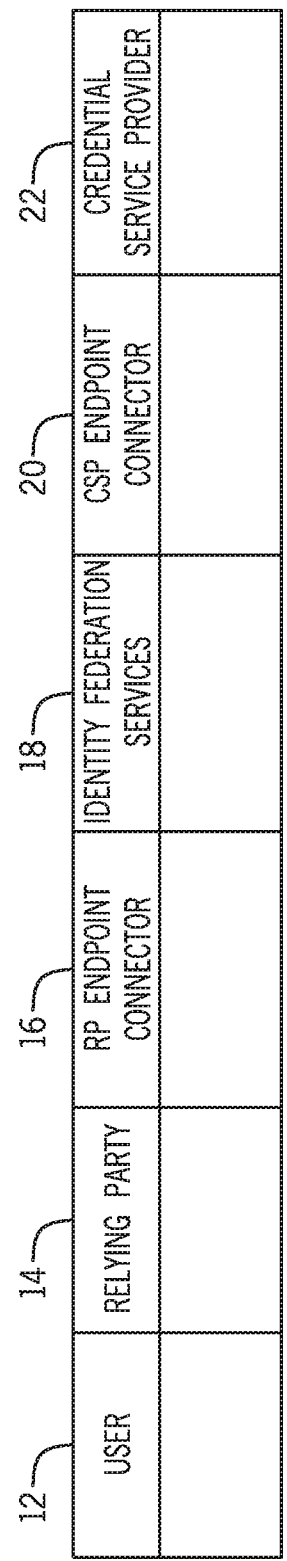

PRIVACY ENSURED BROKERED IDENTITY FEDERATION

CROSS-REFERENCE TO RELATED APPLICATION

This application claims the benefit of priority of U.S. provisional application No. 62/458,151, filed Feb. 13, 2017, the contents of which are herein incorporated by reference.

BACKGROUND OF THE INVENTION

The present invention relates to identity privacy online or more particularly, to user privacy in a brokered identity federation environment.

Traditional brokered identity federation solutions allow the tracking of a user's use of their credential, or tracking who issued the user a credential. Traditional brokered identity federations also require middleware solutions to transpose data, thereby exposing the data to the middleware operator. This often leaves a user's private information vulnerable to parties who need not know it.

As can be seen, there is a need for a need for a more secure, blinded brokered identity federation system.

SUMMARY OF THE INVENTION

In one aspect of the present invention, a privacy ensured brokered identity federation system, includes a computer having a user interface and a program product comprising machine-readable program code for causing, when executed, the computer to perform the process steps. The steps include receiving an authentication request at a server hosting a brokered identity federation service. The authentication request includes a transaction encryption key pair (TEK); a ring signature; and a transaction ID. Responsive to receiving the authentication request, a credential service provider (CSP) selection page displaying one or more CSP participants in the brokered identity federation service is presented. Responsive to a user selection of a selected CSP, the authentication request is transmitted to a CSP endpoint connector associated with the selected CSP after receipt of a request from the selected CSP endpoint connector containing the transaction ID of the authentication request. The transaction request is authenticated by the selected CSP. The user is also authenticated to the CSP.

An identity assertion response including a CSP application key, ring signature, transaction ID, and a set of identity attributes is received. An identity assertion is created for a relying party application to use to determine the user's access to the application. The relying party application man then be used wherein the brokered identity federation service is blinded from transaction data exchanged with the relying party application.

Other aspects of the invention include a non-transitory computer-readable memory adapted to provide a privacy ensured brokered identity federation environment, the non-transitory computer-readable memory is used to direct a computer of to perform process steps. The process steps include receiving an authentication request at a server hosting a brokered identity federation service, the authentication request comprises a transaction encryption key pair (TEK); a ring signature; and a unique transaction ID. Responsive to receiving the authentication request, a credential service provider (CSP) selection page displaying one or more CSP participants in the brokered identity federation service is presented. Responsive to a user selection of a selected CSP, the user is authenticated with the selected CSP via the authentication request. An identity assertion response in created including an application key, a ring signature, transaction ID, and a set of identity attributes.

In some embodiments, the steps are initiated through a configured set of destination URLs. Upon successful completion of a step, a user's browser instructs which URL is to be called upon to perform a subsequent step. In some embodiments, the unique transaction ID is used to identify which transaction in a trust domain is executed at each step.

These and other features, aspects and advantages of the present invention will become better understood with reference to the following drawings, description and claims.

BRIEF DESCRIPTION OF THE DRAWINGS

FIG. 1 is a schematic diagram of a blinded brokered identity federation system;

FIG. 2 is a detailed schematic view of the blinded brokered identity federation system;

DETAILED DESCRIPTION OF THE INVENTION

Figure 3A:
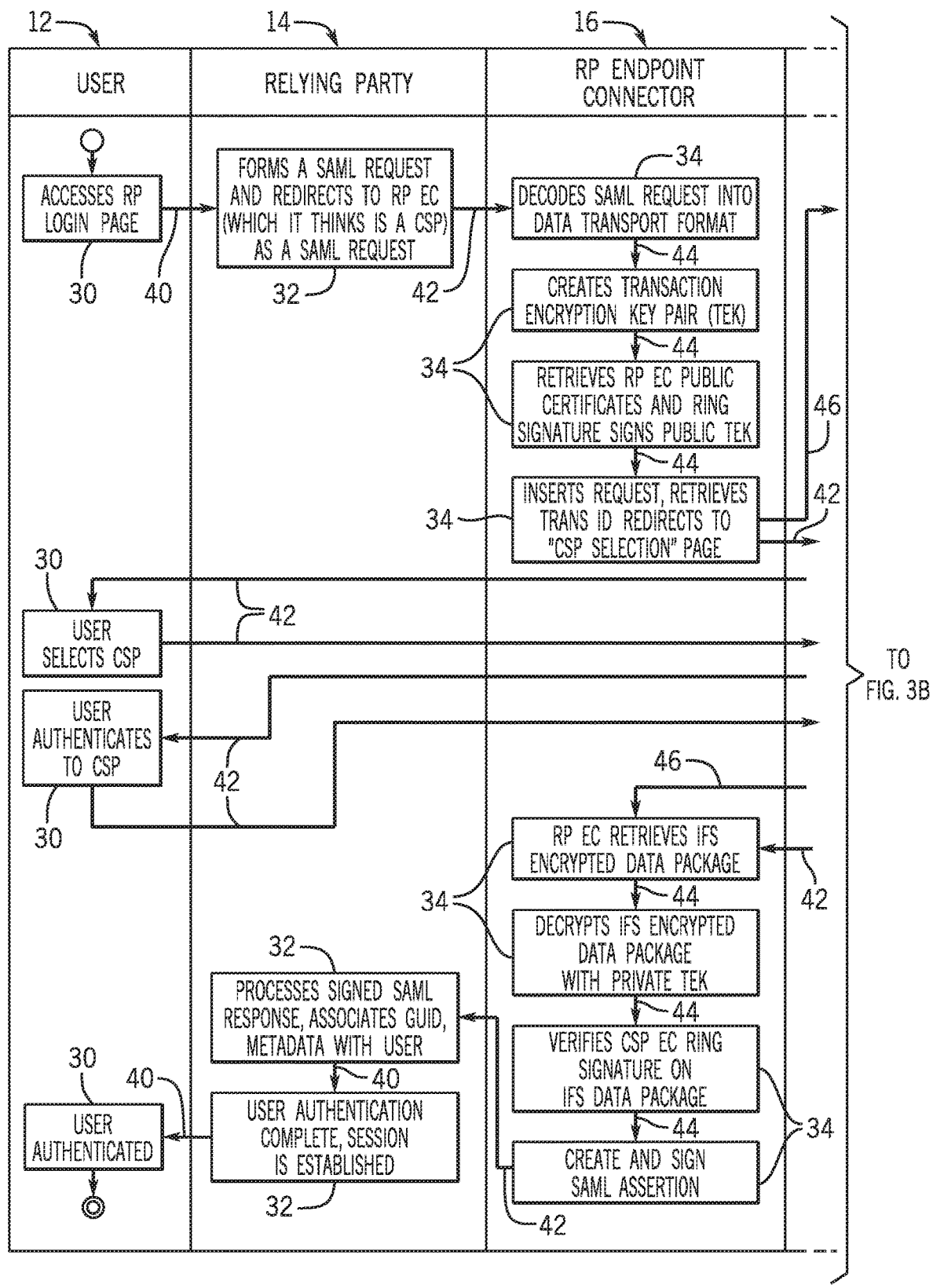
FIG. 3A is a flowchart of the blinded brokered identity federation system.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide a more secure, blinded brokered identity federation system. Traditional brokered identity federation solutions allow tracking of a user's credential, or the tracking of who issued the credential to the user. Traditional brokered identity federations also require middleware solutions or "hubs" to transpose data, exposing potentially sensitive data to the middleware operator. This process often leaves the user's credential information vulnerable and viewable by parties who do not need the information.

Aspects of the present invention can ensure user privacy in a brokered identity federation environment by blinding relying parties from credential service providers, blinding credential service providers from relying parties, and blinding a user's identity and data from the federation middleware hubs.

The primary method for blinding is through the use of "ring signatures". Ring signatures were introduced by Rivest, Shamir and Tauman (R. L. Rivest, A. Shamir and Y. Tauman, How to leak a secret, Advances in Cryptology-Asiacrypt 2001, LNCS 2248, pp. 552-565, Springer-Verlag, 2001). Ring signatures include a group of possible signers, where one ring member can create a signature without disclosing which member performed the signature.

In one embodiment, the process utilizes ring signatures to attest to credential service providers that a valid relying party of the federation is making a request. The process utilizes credential service provider ring signatures to assure relying parties that a valid credential service provider of the federation has provided a response. The process utilizes per transaction encryption keys created by the relying party to ensure the federation has no access to data messages. It can further ensure that only the correct relying party can decrypt the credential service provider response.

Unlike what currently exists, a completely blinded federation can beneficially ensure user privacy, by preventing user tracking and limiting data access to an identity transaction on a need to know basis. Traditional brokered identity federations address privacy with policy only, which cannot be guaranteed, as it assumes operators and administrators will adhere to policy commonly referred to as the "Honest but Curious" security model.

In one embodiment, the invention enables policy enforcement through technical and cryptographic measures such that privacy is guaranteed vs. promised via policy only.

FIG. 1 shows a general flow diagram of the blinded federation process 10. A relying party (RP) 14 connects through a relying party endpoint connector 16, which is connected to an identity federation service 18. The identity federation service 18 connects through a credential service provider (CSP) endpoint connector 20 to a credential service provider 22. The CSP 22 connects through the CSP endpoint connector 20 back through the identity federation service 18, which in turn connects back to the RP 14 via the RP endpoint connector.

Figure 3B:
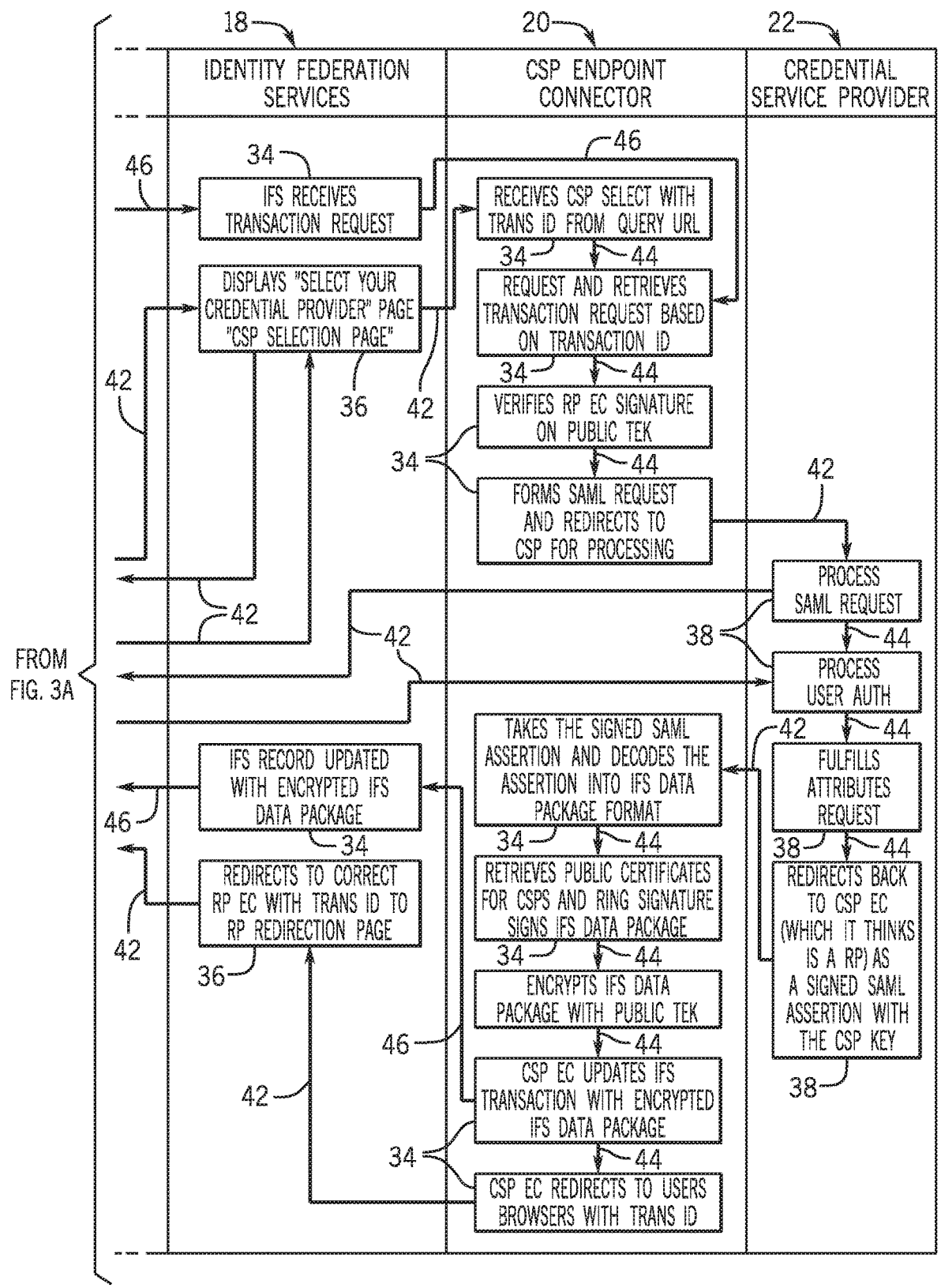
FIG. 3B is a continuation of the flowchart of the blinded brokered identity federation system shown in FIG. 3A.

A detailed schematic view is shown in FIG. 2. FIGS. 3A and 3B show a detailed flow chart of the blinded federation process. The following components are referred to in the respective figures.

As can be seen in the embodiment of FIGS. 1 and 2 and the detailed flowchart of FIGS. 3A and 3B, a user 12 interacts with the system via a plurality of browser components 30, visits a Relying Party (RP) login page online via an SSL/TLS channel 40. The RP 14 includes RP components 32 for processing authentication requests request using a standard federated identity protocol (i.e. SAML, OpenID) and redirects to Relying Party Endpoint Connector (RP EC) 16 via a redirected SSL/TLS channel connection 42 as an authentication request signed with an existing RP key (or unsigned if the RP allows.)

The RP EC 16 employs identity federation service components 34 and interprocess workflows 44 to process the authentication requests. In response to receiving the authentication request from the RP 14, the RP EC 16 decodes the authentication request into a data transport format then creates a onetime Transaction Specific Encryption Key Pair (TEK). A TEK is an asymmetric public and private key pair where the public key is used by the Credential Service Provider Endpoint Connector (CSP EC) 20 to encrypt data and the private key is used by the Relying Party End Point Connector (RP EC) 16 to decrypt data. The RP EC 16 performs a ring signature over the TEK public key with configured and valid federation RP EC public keys. It then proceeds to call the Federation Service 18 to submit the ring signed TEK public key and initiate a transaction via a transaction request submitted via a SSL/TLS channels w/security token authentication 46.

The RP EC 16 then redirects the browser component 30 to the Federation Service Credential Service Provider (CSP) 18 selection page user interface (UI) 36 via the SSL/TSL channel connection 42. The Federation Service CSP selection page 36 allows the user 12 to select an appropriate CSP 22 in their browser 30, which redirects to the CSP EC 20.

The CSP EC 20 retrieves transaction request based on the transaction ID in the ring signed TEK public key and validates the ring signature against a configured list of valid RP EC certificates. The CSP EC 20 forms an authentication request signed with the CSP EC application key. It then redirects or posts to the CSP 22 for user login. The user 12 then logs in per requirements for that CSP 22.

Within the same trust boundary, the CSP 22 sends an identity assertion response signed with the CSP application key to the CSP EC 20. The CSP EC 20 takes the signed identity assertion and decodes the assertion into a set of identity attributes.

The CSP EC 20 then performs a ring signature over the identity attributes with its CSP EC private key and configured federation CSP EC public keys. The CSP EC 22 encrypts the signed attributes with the transaction specific TEK public key. The Federation Service encrypted data package is then sent/updated in the Federation Service 18 via the SSL/TLS channel w/security token authentication 46.

The Federation Service Web User Interface (UI) 36 then redirects the user's browser 30 to the correct RP EC 16. The RP EC 16 then retrieves the encrypted identity attributes and using the transaction specific TEK private key, the RP EC 16 decrypts the identity attributes and validates CSP EC Ring Signature against the configured list of valid CSP EC certificates.

Using the identity attributes, the RP EC 16 creates an identity assertion for the Relying Party application to use to determine the user's access to the application.

In one embodiment, all processing within the respective trust boundaries (both relying parties and credential services providers) are based on standards based identity protocols (i.e. SAML, OpenID) methodology.

In one embodiment, all processing between endpoint connectors 16, 20 and the cloud federation services 18 occurs over one or more authenticated, secure, and private channels.

In one embodiment, all user interactions and process triggers are managed through the user's browser components 30 and session specific states that control which step in the process the user 12 is at and which step in the process is up next.

In one embodiment, all steps in the process are initiated through a configured set of destination URLs. Upon successful completion of a step, the user's browser instructs which URL is to be called upon to perform the next step. A unique transaction ID is used to identify which transaction in either trust domain or the cloud is to be worked on at each step.

In one embodiment, starting with commercially available standards based federated identity protocols (i.e. SAML, OpenID), an individual creates the respective endpoint connectors 16, 20 which facilitate translation, transposition, and encryption/decryption of data messages. It is also necessary to provide a certificate authority platform for the issuance of certificates required for both authentication and for digitally signing data with ring signatures. A cloud based service specific to the federation 18 can act as an intermediary service provider to facilitate secure and private exchange of data between participating relying parties 14 and credential service providers 22 in the federation 18.

It is to be understood that end point connectors 16, 22, while separate and distinct in this description, could be incorporated within commercially available standards based federated identity protocol software products.

It should also be understood that additional elements to those discussed, may be introduced to extend the functionality to other protocols, but the essence of privacy through the use of ring signatures and transaction encryption keys are key components of the described invention. All other processing may be either standards based or not unique.

Advantageously, anyone who wishes to embrace brokered identity federated authentication, but is hesitant due to privacy concerns, can utilize the process of the invention to benefit from the value of a brokered identity federated authentication without fear of identity use tracking, or nefarious identity theft. To implement the invention, the respective members of a federation would embrace both commercially available and standards based identity federation software, and deployment of the respective privacy ensuring endpoint connectors 16, 20.

As a non-limiting example of using the blinded brokered identity federation system 10, consumer user communities often conduct transactions online. All consumer web sites requiring unique identities, issue and require each user to use a web site specific credential to authenticate and complete online transactions on their respective consumer web sites. Many online consumer transactions require payment with the use of a valid bank issued credit card. Banks are required by law and business practice to implement "know your customer" processes for identifying and verifying the identity of clients.

In a brokered identity federated environment, banks could allow the "know your customer" identity credential that is used to authenticate to the bank, to be used to gain access to a consumer web site, and to also provide private and financial information allowing online transactions to be completed without the need for a consumer specific web site credential and more assurance to verify the user's identity.

Traditional brokered identity federation could be used in this use case, but not without risk of user privacy compromise and/or private/financial data compromise. Traditional brokered identity federation does not enforce blinding the banks from knowing the consumer web sites at which the user is doing business. Likewise the traditional brokered identity federation does not blind the consumer web sites from knowing which bank a user does business with. This allows both the banks and consumer web sites to track the users use of their online identity, therefore potentially exposing the user to privacy exposure or compromise.

Additionally, traditional brokered identity federation does not guarantee blinding of user data from the brokered identity federation operator. While the brokered identity federation operator needs to know the identity of the participating banks and consumer web sites in a brokered identity federation, they do not have a need to know the specifics of the user's data being brokered between the banks and the consumer web sites in a brokered identity federation nor should the brokered identity federation operator track who a user banks with or the web sites they access.

In another example, a user 12 accesses Example.com, and can log into Example.com by electing to utilize the brokered identity federation 18. Selecting the brokered identity federation 18, the user 12 is presented with a list of banks who are valid participants in the brokered identity federation 18. The user 12 sees that their bank ("Acme Bank" for example) is a participating brokered identity federation credential provider 22. The user 12 selects to authenticate with their Acme Bank identity credential. The Acme Bank identity service authenticates the user 12 against the Acme Bank identity directory and returns an encrypted response through the brokered identity federation service 18. The encrypted response can only be decrypted by Example.com, thereby preventing the brokered identity federation 18 operator from knowing the data details of the transaction. Example.com receives and decrypts the authentication response, which includes not only identity information but potentially address, financial, and other pertinent information necessary to grant the user access to their Example.com account and complete online transactions/purchases. To ensure only valid brokered identity federation members can participate in the brokered identity federation 18, all requests and responses are digitally signed using ring signatures with valid brokered identity federation participant credentials.

The brokered identity federation service 18 advantageously ensures that: Example.com does not know the user banks with Acme Bank; Acme Bank does not know that the user is making a purchase at Example.com; the brokered identity federation service operator 18 never has access to the user's personal or financial data; and the brokered identity federation service does not know which users are making purchases at Example.com or which bank a user banks with.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A privacy ensured brokered identity federation system, comprising:

a computer having a user interface; and a program product comprising machine-readable program code for causing, when executed, the computer to perform the following process steps:

receiving an authentication request at a server hosting a brokered identity federation service, the authentication request comprising a transaction specific encryption key pair (TEK); a ring signature; and a transaction ID;

responsive to receiving the authentication request, presenting a credential service provider (CSP) selection page displaying one or more CSP participants in the brokered identity federation service; and responsive to a user selection of a selected CSP, transmitting the authentication request to a CSP endpoint connector associated with the selected CSP after receipt of a request from the selected CSP endpoint connector containing the transaction ID of the authentication request.

2. The system of claim 1, further comprising authenticating the transaction request by the selected CSP.

3. The system of claim 2, further comprising: authenticating the user to the CSP.

4. The system of claim 3, further comprising receiving an identity assertion response including a CSP application key, the ring signature, the transaction ID, and a set of identity attributes.

5. The system of claim 4, further comprising: creating an identity assertion for a relying party application to use to determine the user's access to the application.

6. The system of claim 5, further comprising: using the relying party application wherein the brokered identity federation service is blinded from transaction data exchanged with the relying party application.

7. A non-transitory computer-readable memory adapted to provide a privacy ensured brokered identity federation environment, the non-transitory computer-readable memory storing instructions, when executed by a processor of a computer, directs the computer to perform the steps of:

receiving an authentication request at a server hosting a brokered identity federation service, the authentication request comprising a transaction specific encryption key pair (TEK); a ring signature; and a unique transaction ID;

responsive to receiving the authentication request, presenting a credential service provider (CSP) selection page displaying one or more CSP participants in the brokered identity federation service; and responsive to a user selection of a selected CSP, transmitting the authentication request to a CSP endpoint connector associated with the selected CSP after receipt of a request from the selected CSP endpoint connector containing the transaction ID of the authentication request, and authenticating the user with the selected CSP via the authentication request.

8. The non-transitory computer-readable memory of claim 7, wherein the steps are initiated through a configured set of destination URLs.

9. The non-transitory computer-readable memory of claim 8, wherein, upon successful completion of a step, a user's browser instructs which URL is to be called upon to perform a subsequent step.

10. The non-transitory computer-readable memory of claim 7, wherein the unique transaction ID is used to identify which transaction in a trust domain is executed at each step.

11. The non-transitory computer-readable memory of claim 7, wherein the instructions directs the computer to further perform the step of receiving an identity assertion response including an application key, the ring signature, the transaction ID, and a set of identity attributes.

* * * * *